(12) United States Patent
Hohlbein

(10) Patent No.: US 9,167,890 B2
(45) Date of Patent: Oct. 27, 2015

(54) ORAL CARE IMPLEMENT HAVING A DECORATIVE MEMBER AND A METHOD OF FORMING THE SAME

(75) Inventor: Douglas J. Hohlbein, Hopewell, NJ (US)

(73) Assignee: COLGATE-PALMOLIVE COMPANY, New York, NY (US)

( * ) Notice: Subject to any disclaimer, the term of this patent is extended or adjusted under 35 U.S.C. 154(b) by 0 days.

(21) Appl. No.: 13/982,467

(22) PCT Filed: Feb. 1, 2011

(86) PCT No.: PCT/US2011/023368
§ 371 (c)(1),
(2), (4) Date: Jul. 29, 2013

(87) PCT Pub. No.: WO2012/105964
PCT Pub. Date: Aug. 9, 2012

(65) Prior Publication Data
US 2013/0305472 A1    Nov. 21, 2013

(51) Int. Cl.
*A46B 9/04* (2006.01)
*A46B 15/00* (2006.01)
(Continued)

(52) U.S. Cl.
CPC ............. *A46B 15/0087* (2013.01); *A46B 9/04* (2013.01); *B29C 45/1671* (2013.01); *G09F 23/00* (2013.01); *G09F 23/0075* (2013.01); *A46B 2200/1066* (2013.01); *A46D 3/00* (2013.01); *B29C 2045/1673* (2013.01); *B29C 2045/1693* (2013.01); *B29K 2995/002* (2013.01);
(Continued)

(58) Field of Classification Search
CPC .. A46B 15/0085; A46B 15/0087; A46B 9/04; G09F 27/00; G09F 23/0075
USPC ................................. 15/143.1, 167.1; 40/314
See application file for complete search history.

(56) References Cited

U.S. PATENT DOCUMENTS 876,317 A * 1/1908 Booth ............................. 40/314
1,211,468 A * 1/1917 McLean ......................... 40/314
(Continued)

FOREIGN PATENT DOCUMENTS

CA    2338817    2/2000
CN    2347477    11/1999
(Continued)

OTHER PUBLICATIONS

International Search Report and Written Opinion in International Application No. PCT/US11/023368, mailed Dec. 2, 2011.
(Continued)

*Primary Examiner* — Monica Carter
*Assistant Examiner* — Michael Jennings

(57) ABSTRACT

An oral car implement (100) having a decorative member (150) recessed in a handle (120) of the oral care implement and having at least a portion thereof exposed via an aperture (140), and a method of forming the same. In one aspect, the invention can be an oral care implement (120) comprising: a handle having a longitudinal axis and a head (110) connected to the handle; the handle comprising a first transverse section (122) and a second transverse section (121), the first transverse section coupled to the second transverse section; a decorative member disposed between the first transverse section and the second transverse section; and an aperture extending through the first transverse section that exposes at least a portion of the decorative member.

27 Claims, 4 Drawing Sheets

(51) Int. Cl.
  B29C 45/16 (2006.01)
  G09F 23/00 (2006.01)
  G09F 27/00 (2006.01)
  A46D 3/00 (2006.01)
  B29L 31/42 (2006.01)

(52) U.S. Cl.
  CPC ... *B29K2995/0026* (2013.01); *B29L 2031/425* (2013.01); *G09F 27/00* (2013.01)

(56) References Cited

U.S. PATENT DOCUMENTS

| | | | |
|---|---|---|---|
| 1,222,377 A | 4/1917 | Flint | |
| RE14,589 E * | 2/1919 | Booth | 40/314 |
| 1,364,188 A | 1/1921 | Draenert | |
| 1,506,401 A | 8/1924 | Young | |
| 2,317,123 A * | 4/1943 | Warp | 40/314 |
| 2,489,707 A * | 11/1949 | Eubanks | 206/361 |
| 3,363,039 A | 1/1968 | Nagai et al. | |
| 4,089,922 A | 5/1978 | Saito et al. | |
| 4,330,578 A | 5/1982 | Nishihira et al. | |
| 4,589,159 A | 5/1986 | Streibel | |
| 5,339,482 A * | 8/1994 | Desimone et al. | 15/167.1 |
| 5,630,244 A * | 5/1997 | Chang | 15/167.1 |
| 5,769,506 A | 6/1998 | Boucherie | |
| 6,687,940 B1 * | 2/2004 | Gross et al. | 15/167.1 |
| 7,047,591 B2 * | 5/2006 | Hohlbein | 15/143.1 |
| 7,415,788 B2 | 8/2008 | Little et al. | |
| 7,458,125 B2 * | 12/2008 | Hohlbein et al. | 15/143.1 |
| 8,091,170 B2 * | 1/2012 | Moskovich et al. | 15/110 |
| 8,161,591 B2 * | 4/2012 | Gatzemeyer et al. | 15/143.1 |
| 8,307,488 B2 * | 11/2012 | Pfenniger et al. | 15/22.1 |
| 8,499,397 B2 * | 8/2013 | Gatzemeyer et al. | 15/22.1 |
| 8,510,893 B2 * | 8/2013 | Wong et al. | 15/167.1 |
| 8,529,150 B2 * | 9/2013 | Olson | 401/286 |
| 8,539,632 B2 * | 9/2013 | Kraemer | 15/167.1 |
| 8,549,691 B2 * | 10/2013 | Moskovich et al. | 15/143.1 |
| 8,745,805 B2 * | 6/2014 | Wong et al. | 15/167.1 |
| 2001/0002605 A1 | 6/2001 | Morawski et al. | |
| 2002/0124864 A1 | 9/2002 | Gross et al. | |
| 2003/0070259 A1 * | 4/2003 | Brown et al. | 16/436 |
| 2003/0208145 A1 | 11/2003 | Stewart | |
| 2005/0044646 A1 * | 3/2005 | Peretz et al. | 15/143.1 |
| 2006/0123574 A1 | 6/2006 | Storkel et al. | |
| 2006/0213018 A1 * | 9/2006 | Gross et al. | 15/143.1 |
| 2006/0230652 A1 | 10/2006 | Little | |
| 2007/0186453 A1 * | 8/2007 | Little et al. | 40/314 |
| 2009/0072610 A1 * | 3/2009 | Sorrentino et al. | 300/21 |
| 2009/0313778 A1 * | 12/2009 | Wong et al. | 15/167.1 |
| 2010/0218322 A1 * | 9/2010 | Gatzemeyer et al. | 15/4 |
| 2011/0056032 A1 * | 3/2011 | Shih | 15/22.1 |
| 2011/0067193 A1 * | 3/2011 | Olson | 15/167.1 |
| 2011/0247158 A1 * | 10/2011 | Jungnickel et al. | 15/167.1 |
| 2011/0314623 A1 * | 12/2011 | Jimenez et al. | 15/167.1 |

FOREIGN PATENT DOCUMENTS

| | | |
|---|---|---|
| CN | 2645505 | 10/2004 |
| CN | 2735829 Y | 10/2005 |
| CN | 201180231 | 1/2009 |
| DE | 3622596 | 1/1987 |
| DE | 20021315 | 5/2001 |
| EP | 0805019 | 11/1997 |
| EP | 1025963 | 8/2000 |
| EP | 1188534 | 3/2002 |
| FR | 2079455 | 11/1971 |
| GB | 351159 | 6/1931 |
| GB | 2074857 | 11/1981 |
| JP | 2-71710 A | 3/1990 |
| JP | 5-329023 A | 12/1993 |
| JP | 10-179258 A | 7/1998 |
| JP | 10-276836 A | 10/1998 |
| JP | 11-75938 A2 | 3/1999 |
| WO | WO 02/006034 | 1/2002 |
| WO | WO 2004/043669 | 5/2004 |
| WO | WO 2007/053034 | 5/2007 |

OTHER PUBLICATIONS

Canadian Office Action dated Jun. 25, 2014 for corresponding CA Application No. 2,824,457. CA.

* cited by examiner

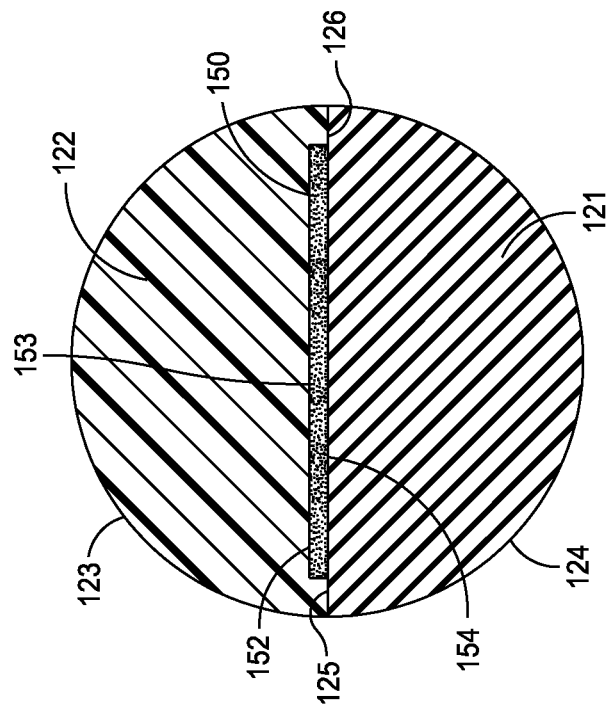
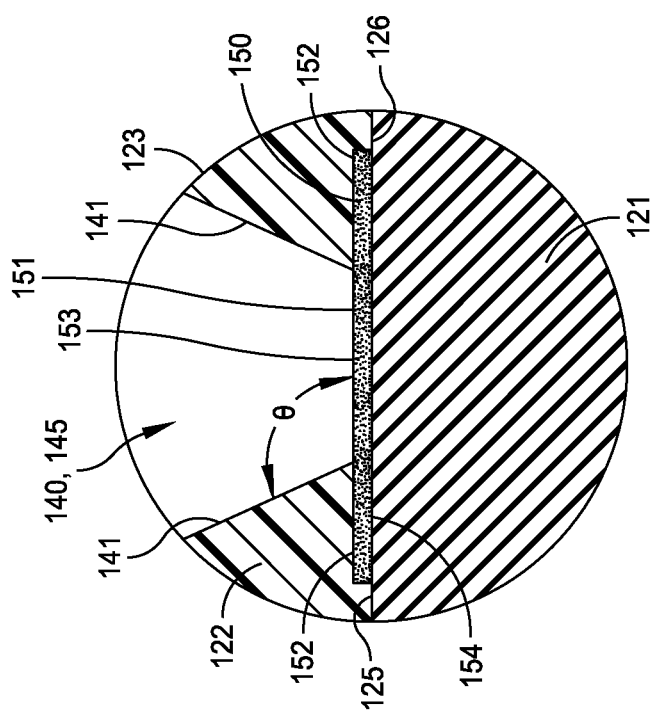

ORAL CARE IMPLEMENT HAVING A DECORATIVE MEMBER AND A METHOD OF FORMING THE SAME

CROSS-REFERENCE TO RELATED PATENT APPLICATIONS

The present application is a U.S. national stage application under 35 U.S.C. §371 of PCT Application No. PCT/US2011/023368, filed Feb 1, 2011, the entirety of which is incorporated herein by reference.

FIELD OF THE INVENTION

The present invention relates generally to an oral care implement and method of manufacturing the same, and specifically to a handle of an oral care implement having a decorative member that is protected against wear and methods of manufacturing the same.

BACKGROUND OF THE INVENTION

Decorative members, such as logos, symbols, or other designs, are often applied to the handles of oral care implements. Such decorative members are used for a wide variety of reasons, including: to attract the attention of children; to identify the source and/or trade name of the oral care implement; to display a desired message and/or visual indicia; and/or to create a desired visual effect to the user. In some existing oral care implements, the decorative member is formed by providing a raised portion directly on the exterior surface of the toothbrush. However, this raised portion can be uncomfortable to a user, can be difficult to see, and/or can become easily worn during the natural use of the oral care implement.

It also known to embed a decorative member within the oral care implement so that it is viewable and protected against wear. In such known embodiment, the decorative member is embedded and completely encapsulated within the handle of the oral care implement. However, the decorative member is still viewable to the user by utilizing a transparent material to completely encapsulate the decorative member thereunder. While embedding and completely encapsulating the decorative member within the handle protects the decorative member against any damage due to wear, it also decreases and distorts the visibility of the decorative member. Such distortion is caused by: (1) the decorative member being viewed through the curved surfaces of the handle; and/or (2) the transparent material having a less than perfect transparency quality. Such distortion of the decorative member may make it difficult for a user to clearly view the decorative member. Furthermore, these oral care implements require additional materials in order to fully encapsulate the decorative member, which results in an added cost.

Thus, a need exists for an oral care implement having a decorative member wherein the decorative member is viewable without distortion, is protected against damage and wear and tear, and/or has a lower material cost.

BRIEF SUMMARY OF THE INVENTION

The present invention is directed to an oral care implement with a handle having a decorative member recessed therein and having at least a portion of the decorative member exposed via an aperture.

In one aspect, the invention can be an oral care implement comprising: a handle having a longitudinal axis and a head connected to the handle; the handle comprising a first transverse section and a second transverse section, the first transverse section coupled to the second transverse section; a decorative member disposed between the first transverse section and the second transverse section; and an aperture extending through the first transverse section that exposes at least a portion of the decorative member.

In another aspect, the invention can be a method of forming an oral care implement comprising: a) forming a first transverse section of a handle of the oral care implement, the first transverse section comprising an aperture extending therethrough; b) applying a decorative member to the first transverse section so that at least a portion of the decorative member covers the aperture; and c) forming a second transverse section of the handle on the first transverse section, the decorative member disposed between the first and second transverse sections.

In yet another aspect, the invention can be a method of forming an oral care implement comprising: a) forming a first transverse section of a handle of the oral care implement; b) applying a decorative member to the first transverse section; c) forming a second transverse section of the handle on the first transverse section, the decorative member disposed between the first and second transverse sections, and the second transverse section comprising an aperture through which at least a portion of the decorative member is exposed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a transverse cross-sectional view of the oral care implement of FIG. 1 taken along line III-III;

FIG. 4 is a transverse cross-sectional view of the oral care implement of FIG. 1 taken along line IV-IV.

DETAILED DESCRIPTION OF THE INVENTION

Figure 1:
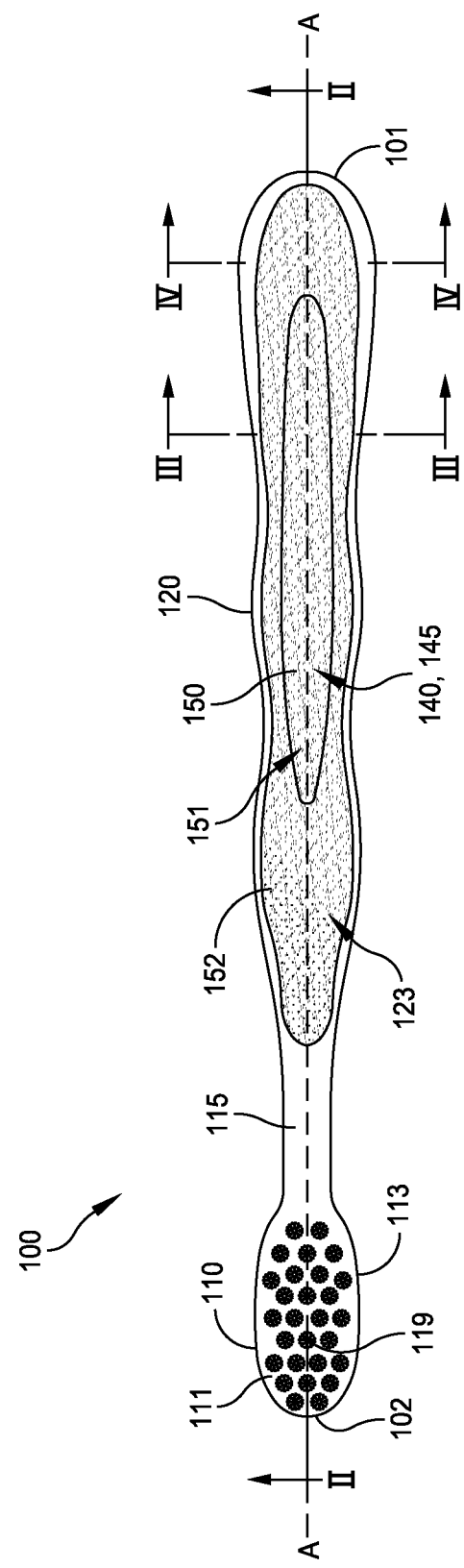
FIG. 1 is a front view of an oral care implement in accordance with one embodiment of the present invention.

The following description of the preferred embodiment(s) is merely exemplary in nature and is in no way intended to limit the invention, its application, or uses. The description of illustrative embodiments according to principles of the present invention is intended to be read in connection with the accompanying drawings, which are to be considered part of the entire written description. In the description of the exemplary embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are described by reference to the exemplary embodiments illustrated herein. Accordingly, the invention expressly should not be limited to such exemplary embodiments, even if indicated as being preferred. The discussion herein describes and illustrates some possible non-limiting combinations of features that may exist alone or in other combinations of features. The scope of the invention is defined by the claims appended hereto.

Preferred embodiments of the present invention will now be described herein with respect to one possible embodiment of an oral care implement, namely a manual toothbrush. However, in other forms, the invention could be in the form of other oral care implements including a soft-tissue cleansing implement, a powered toothbrush, or other ansate implements designed for oral care.

Referring now to FIG. 1, an oral care implement 100 is illustrated according to one embodiment of the present invention. The oral care implement 100 generally comprises a handle 120 and a head 110. The handle 120 provides the user with a mechanism by which he/she can readily grip and manipulate the oral care implement 100. The handle 120 includes ergonomic features which provide a high degree of control for the user while maintaining comfort. The head 110 is connected to the handle 120 by a neck 115. The head 110 includes a set of teeth cleaning elements 119 which are generically illustrated.

Figure 2:
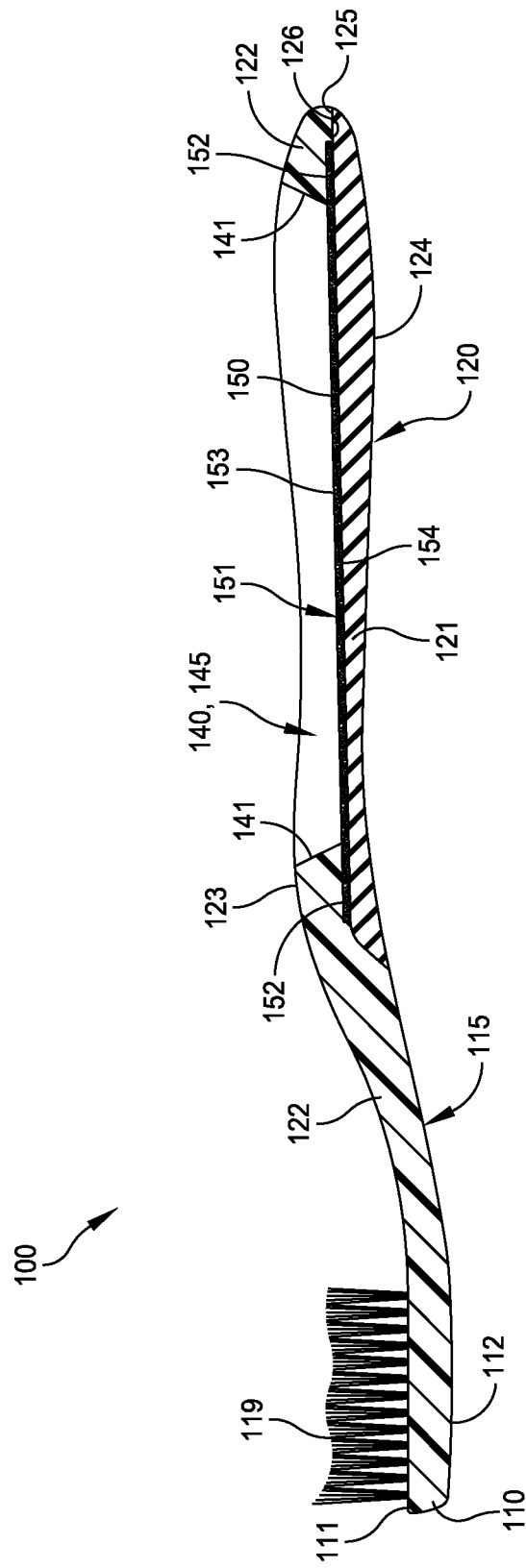
FIG. 2 is a longitudinal cross-sectional view of the oral care implement of FIG. 1 taken along line II-II.

Generally, the oral care implement 100 extends from a proximal end 101 (which is also the proximal end of the handle 110) to a distal end 102 along a longitudinal axis A-A. Conceptually, the longitudinal axis A-A is a reference line that is generally coextensive with the three-dimensional center line of the handle 120 and the head 110. Because the handle 120 is a non-linear structure (as can be seen in FIG. 2 as viewed laterally) in the illustrated embodiment, the longitudinal axis A-A for the oral care implement 100 is also non-linear in the illustrated embodiment. However, the invention is not so limited, and in certain embodiments the oral care implement 100 may have a simple linear arrangement and thus a substantially linear longitudinal axis A-A.

As noted above, the head 110 is coupled to the handle 120 via the neck 115. As discussed in greater detail below, the head 120, the neck 115, and an upper transverse section 122 of the handle 120 of the oral care implement 100 are formed as an integral structure using an injection molding process in the exemplified embodiment of FIGS. 1-4. Furthermore, as discussed in greater detail below, in the exemplified embodiment of FIG. 5, the head 220, the neck 215, and a lower transverse section 221 of the handle 220 of the oral care implement 200 are formed as an integral structure using an injection molding process. However, in other embodiments, the handle 120 and the head 110 may be formed as separate components which are operably connected at a later stage of the manufacturing process by any suitable technique known in the art, including without limitation thermal welding, sonic welding, a tight-fit assembly, a coupling sleeve, adhesion or fasteners. Whether the head 110 and the handle 120 (or a transverse section thereof) are constructed as an integral piece or a multi-piece assembly (including connection techniques) is not limiting of the present invention in all embodiments. Furthermore, other manufacturing techniques may be used in place of and/or in addition to injection molding to create the handle 110 (of transverse sections thereof) and/or the head 120 (or components thereof), such as milling and/or machining Referring now to FIGS. 1 and 2 concurrently, the head 110 generally comprises a front surface 111 and a rear surface 112. The front surface 111 and the rear surface 112 of the head 110 can take on a wide variety of shapes and contours, none of which are limiting of the present invention. For example, the front and rear surfaces 111, 112 can be planar, contoured or combinations thereof. The front surface 111 and rear surface 112 are bound by a peripheral or lateral surface 113.

A set of cleaning elements 119, which are generically illustrated as a plurality of circular tufts of bristles, are provided on and extend outward from the front surface 111 of the head 110 for cleaning contact with an oral surface, preferably teeth. While the set of cleaning elements 119 is particularly suited for brushing teeth, the set of cleaning elements 119 can also be used to clean oral soft tissue, such as a tongue, gums, or cheeks instead of or in addition to teeth. As used herein, the term "cleaning element" is used in a generic sense to refer to any structure that can be used to clean or massage an oral surface through relative surface contact.

Common examples of "cleaning elements" include, without limitation, filament bristles, fiber bristles, nylon bristles, spiral bristles, rubber bristles, elastomeric protrusions, flexible polymer protrusions, co-extruded filaments, flag bristles, crimped bristles, anti-bacterial bristles and combinations thereof and/or structures containing such materials or combinations.

The set of cleaning elements 119 can be connected to the head 110 in any manner known in the art. For example, anchor free tufting (AFT) could be used to mount the cleaning elements. In AFT, a plate or membrane is secured to the brush head such as by ultrasonic welding. The bristles (or other elastomeric elements) extend through the plate or membrane. The free ends of the bristles on one side of the plate or membrane perform the cleaning function. The ends of the bristles on the other side of the plate or membrane are melted together by heat to be anchored in place. Any suitable form of cleaning elements may be used in the broad practice of this invention. Alternatively, the bristles could be mounted to tuft blocks or sections by extending through suitable openings in the tuft blocks so that the base of the bristles is mounted within or below the tuft block. Staple technology may also be used.

Furthermore, if desired, the rear surface 112 of the head 110 may also comprise additional structures for oral cleaning, such as a soft tissue cleanser. Such soft tissue cleansers are typically constructed of a thermoplastic elastomer ("TPE") and include one or more projections, such as nubs and/or ridges, for engaging and massaging soft oral tissue, such as the tongue.

Still referring to FIGS. 1 and 2, the handle 120 is formed of a lower transverse section 121 and an upper transverse section 122, which are coupled together. The upper transverse section 122, which comprises an outer surface 123 and a bottom surface 126, is integrally formed with the neck 115 and the head 110 to form a unitary structure. The lower transverse section 121, which comprises a top surface 125 and an outer surface 124, is coupled to the upper transverse section 122. More specifically, the top surface 125 of the lower transverse section 121 is coupled to the bottom surface 126 of the upper transverse section 122. The coupling of the lower and upper transverse sections 121, 122 can be achieved in any manner known in the art such as, for example, thermal welding, sonic welding, a tight-fit assembly, a coupling sleeve, adhesion, fasteners or other techniques. In one exemplary embodiment, the coupling of the upper and lower transverse sections 121, 122 are coupled together via a bond that is formed between the materials of the upper and lower transverse sections 121, 122 during an injection molding process.

It should be noted that while the exemplary embodiments of the handles 120, 220 of the oral care implements 100, 200 of FIGS. 1-5 include two transverse sections, in other embodiments of the invention, more than two transverse sections may used to create the handles 120, 220. Moreover, gripping overlays, such as TPE overlays, can be included on one or all of the transverse sections as desired. Furthermore, while the transverse sections of the handles are arranged in an upper-lower relative arrangement in the exemplary embodiments of the invention, the invention is not so limited and the transverse sections may be arranged in a side-by-side (i.e., left-right) or angled relative arrangement.

The outer surface 124 of the lower transverse section 121 and the outer surface 123 of the upper transverse section 122 collectively form the outer surface of the handle 120 that enables a user to manipulate the oral care implement 100 during use. As can be seen in FIG. 4, the outer surfaces 124, 123 collectively form an elliptical transverse cross-sectional profile for the handle 120.

In one embodiment, one of the lower and upper transverse sections 121, 122 is formed of a rigid material while the other one of the lower and upper transverse sections 121, 122 is formed of an elastomeric material. In one such embodiment, the lower transverse section 121 is formed of an elastomeric material while the upper transverse section 122 is formed of a rigid material. In another such embodiment, the lower transverse section 121 is formed of a rigid material while the upper transverse section 122 is formed of an elastomeric material. In another embodiment, both the lower and upper transverse sections 121, 122 are formed of a rigid material.

Suitable rigid materials include hard plastics, such as, without limitation, polyethylene, polypropylene (PP), polyamide, polyester, cellulosics, SAN, acrylic, ABS or any other of the commonly known hard thermoplastics used in toothbrush manufacturing. One suitable elastomeric material is a thermoplastic elastomer ("TPE"). In certain embodiments, the TPE has a hardness in a range of 8 to 65 shore A. However, the exact hardness of the TPE used in any specific embodiment of the invention will be dictated by the percentage of the transverse cross-sectional area of the handle occupied by the transverse section formed of TPE.

For reasons that will become apparent from the discussion below, the material selected for the upper transverse section 122 is preferably a transparent material, irrespective of whether the upper transverse section 122 is a rigid material or an elastomeric material. It should be understood that as used herein, the term "transparent" includes both colored transparency and colorless transparency, and is intended to include any material through which an embedded feature is visible therethrough as described below.

Suitable transparent materials include, without limitation, clarified PP, SAN, copolyester, transparent TPE, PET, ABS, CAP, PU. While not preferred, in some embodiments, the upper transverse section 122 can be formed of an opaque or other non-transparent material, irrespective of whether the upper transverse section 122 is a rigid material or an elastomeric material. The lower transverse section 121 can be formed of a transparent material or an opaque material, irrespective of whether the lower transverse section 121 is a rigid material or an elastomeric material In the embodiment of FIGS. 1-4, the lower transverse section 121 is formed of a transparent elastomeric material and the upper transverse section 122 is formed of a transparent rigid material. However, in another embodiment, the lower transverse section 121 is formed of an elastomeric rigid material and the upper transverse section 122 is formed of a transparent elastomeric material. In still another embodiment, the lower transverse section 121 is formed of a transparent rigid material and the upper transverse section 122 is formed of a transparent rigid material. In a further embodiment, the lower transverse section 121 is formed of an opaque rigid material and the upper transverse section 122 is formed of a transparent elastomeric material. In an even further embodiment, the lower transverse section 121 is formed of an opaque rigid material and the upper transverse section 122 is formed of a transparent rigid material. In a yet further embodiment, the lower transverse section 121 is formed of an opaque elastomeric material and the upper transverse section 122 is formed of a transparent rigid material.

Referring still to FIGS. 1 and 2 concurrently, the handle 120 of the oral care implement 100 further comprises a decorative member 150 disposed between the lower transverse section 121 and the upper transverse section 122. The decorative member 150 comprises a top surface 153 and a bottom surface 154. The decorative member 150 can be any type of element that can be used to effectuate and/or include a visual indicia. For example, the decorative member 150 can be a layer of ink (or other colorant or pigment) printed directly onto one of the upper and/or lower transverse sections 121, 122. In other embodiments, the decorative member 150 may be a decal, which can be a single or multi-layer laminate, that is positioned between the lower and upper transverse sections 121, 122 as illustrated. When the decorative member 150 is a decal, the visual indicia can be on one or both surfaces of the decal. Examples of visual indicia include, without limitation, logos, alphanumeric symbols, characters, animals, plants, patterns, symbols, combinations thereof, and/or other graphical elements.

In the illustrated embodiment, the bottom surface 154 of the decorative member 150 is in contact with the top surface 125 of the lower transverse section 121 while a portion of the top surface 153 of the decorative member 150 is in contact with the bottom surface 126 of the upper transverse section 122. As a result, the decorative member 150 is "sandwiched" between the lower and upper transverse sections 121, 122. As can be seen, the entirety of the top surface 153 of the decorative member 150 is not in contact with the bottom surface 126 of the upper transverse section 122. Therefore, the decorative member 150 can be conceptually divided into a covered portion 152 that is in contact with the bottom surface 126 of the upper transverse section 122 and an exposed portion 151 that is not in contact with the bottom surface 126 of the upper transverse section 122. Thought of another way, the upper transverse section 122 overlies the covered portion 152 of the decorative member 150 while the exposed portion 151 is exposed via an aperture 140, as will be discussed in more detail below.

As mentioned above, the upper transverse section 122 comprises an aperture 140 extending therethrough. The aperture 140 forms a transverse passageway through the upper transverse section 122 extending from outside of the oral care implement 100 to the exposed portion 151 of the decorative member 150. In one embodiment, the aperture 140 occupies between 5% to 95% of the transverse cross-sectional area of the upper transverse section 122 (for at least one axial position). In a more specific embodiment, the aperture 140 occupies between 25% to 75% of the transverse cross-sectional area of the upper transverse section 122 (for at least one axial position). Of course, the invention is not to be limited by the size of the aperture 140 and may occupy more or less of the transverse cross-sectional area of the upper transverse section 122 as desired. Furthermore, in the exemplified embodiment, the aperture 140 is an oval that is elongated along the longitudinal axis A-A. Other shapes and sizes of the aperture 140 can be used to expose different sizes and shapes of the decorative member 150 or portions thereof as would be known to persons skilled in the art.

As noted above, in a preferred embodiment, the upper transverse section 122 is formed of a transparent material so that the covered portion 152 of the decorative member 150, in addition to the exposed portion 151, are visible to user. Specifically, the covered portion 152 of the decorative member 150 is visible through the transparent material of the upper transverse section 122 while the exposed portion is visible through the aperture 140. While the visibility of the covered portion 152 of the decorative member 150 may be distorted or otherwise altered due to being viewed through the transparent material, the exposed portion 151 of the decorative member 150 will be clearly viewable without any distortion as it is viewed in an unimpeded manner via the aperture 140.

The exposed portion 151 of the decorative member 150 is circumferentially surrounded by the covered portion 152 of the decorative member 150. Thus, in the exemplified embodiment, the covered portion 152 of the decorative member 150 is a perimeter portion of the decorative member 150. In other embodiment, the covered portion 152 of the decorative member 150 may only consist of a portion (or portions) of the perimeter of the decorative member 150 so that at least a part of the peripheral edge of the decorative member 150 is exposed through the aperture 140. In other embodiments, the entirety of the decorative member 150 may be located within and exposed via the aperture 140. In such an embodiment, the entirety of the decorative member 150 is the exposed portion 151.

In certain embodiments, the visual indica are located, at least in part, on the exposed portion 151 of the decorative member 150. Such positioning of the visual indicia enhances visibility of the visual indicia because it is not covered by the upper transverse section 122. However, as will be described below, the exposed portion 151 of the decorative member 150 is still protected against wear and other contact damage because it is recessed with respect to the outer surface 123 of the handle 120.

Referring now to FIGS. 2 and 3 concurrently, the details of the aperture 140 (and its forming structure) will be described in more detail. When the handle 120 of the oral care implement 100 is assembled (as illustrated in FIGS. 2 and 3), the aperture 140 forms a basin 145 in the outer surface 123 of the upper transverse section 122. The floor of the basin 145 is formed by a top surface 153 of the decorative member 150 and, more specifically, the top surface 153 of the exposed portion 151 of the decorative member 150. An upstanding wall 141 extends upward from the top surface 153 of the exposed portion 151 of the decorative member 150 and terminates at the outer surface 123 of the upper transverse section 122. In the illustrated embodiment, the upstanding wall 141 extends from the top surface 153 of the decorative member 150 in an inclined manner relative thereto. In one embodiment, the upstanding wall 141 is inclined at an angle Θ relative to the top surface 153, wherein the angle Θ is in a range between 93° to 135°. However, the invention is not so limited and, in other embodiments, the upstanding wall 141 may extend from the top surface 153 of the decorative member 150 in a substantially normal manner.

As mentioned above, the exposed portion 151 of the decorative member 150 is recessed relative to the outer surface 123 of the upper transverse section 122. Thus, a user can grip the handle 120 without coming into contact with the decorative member 150. This structure protects the decorative member 150 against wear and other contact-induced damage. Moreover, even if the oral care implement 100 is placed against a flat surface, such as a countertop, the decorative member 150 will not contact the flat surface because it is recessed relative to the outer gripping surface of the handle 120.

Referring now to FIG. 4, a transverse cross-section of a portion of the oral care implement 100 that does not include the aperture 140 is illustrated. While the cross-sectional view of FIG. 4 is taken at a location near the proximal end 101 of the handle 120, the description below is also applicable to the other portions of the handle 120 that do not include the aperture 140 but include the decorative member 150. In these sections of the handle 120, the covered portions 152 of the decorative member 150 are "sandwiched" between the lower and upper transverse sections 121, 122 . In embodiments where the upper transverse section 122 is transparent, the decorative member 150 is visible through the upper transverse section 122.

On the portions of the handle 120 that do not include the aperture 140 and do not include the decorative member 150, the first transverse section 121 is coupled directly to the upper transverse section 122 through direct contact and coupling between the top surface 125 of the first transverse section 121 to the bottom surface 126 of the upper transverse section 122 in the manner discussed above. Of course, an intervening layer and/or material may be used in certain embodiments. Moreover, while the top and bottom surfaces 125, 126 of the upper and lower transverse sections 122, 121 are substantially planar in the exemplified embodiment, the invention is not so limited. In other embodiments, one or both of the top and bottom surfaces 125, 126 of the upper and lower transverse sections 122, 121 can be contoured and/or can include mating topography in the form of protrusions and depressions if desired.

Figure 5:
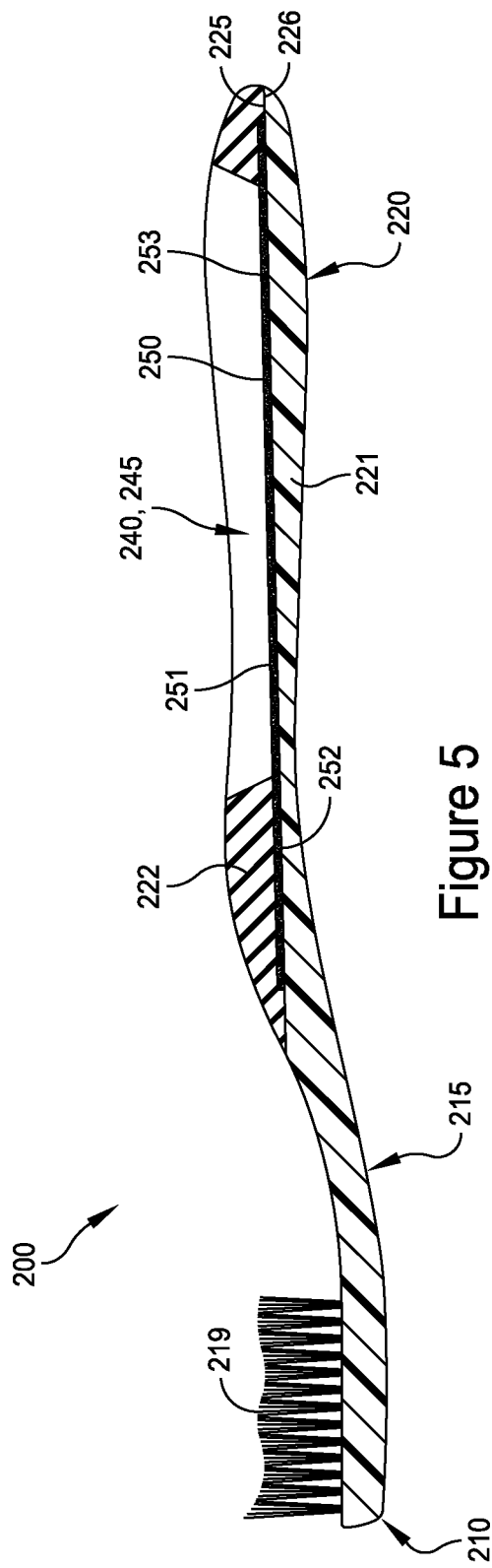
FIG. 5 is a longitudinal cross-sectional view of an oral care implement in accordance with a second embodiment of the present invention.

Referring to FIG. 5, a second embodiment of an oral care implement 200 in accordance with the present invention is illustrated. The oral care implement 200 will be described using a similar numbering scheme as used for the oral care implement 100 discussed above, with the exception that the "200" series of numbers will be used. The oral care implement 200 is substantially similar to the oral care implement 100 except for differences discussed below. In order to avoid redundancy, only those aspects of the oral care implement 200 that differ from the oral care implement 100 will be described below with the understanding that the discussion above with respect to the oral care implement 100 is applicable in all other regards.

The oral care implement 200 comprises a handle 220 and a head 210, the head 210 is connected to the handle 220 by a neck 215. The handle 220 comprises a lower transverse section 221 and an upper transverse section 222. In this embodiment, the lower transverse section 221 is integral with the neck 215 and the head 210 to form a unitary structure. The upper transverse section 222 is a separate component from the lower transverse section 221, the neck 215 and the head 210. The upper transverse section 222 is coupled to the lower transverse section 221 in the manner described above with reference to FIGS. 1 and 2. In both the embodiment of FIG. 2 and the embodiment of FIG. 5, when the selected transverse section is integral with the neck and head, it is preferred that the selected transverse section be constructed of a suitable rigid material so that the head and neck have sufficient structural integrity.

A first method of forming the oral care implement 100 according to one embodiment of the present invention will now be described. While the method will be described below with respect to one particular embodiment of the oral care implement 100 regarding particular materials of construction of the transverse sections 121, 122 and the decorative label 150, it is to be understood that any of the material permutations described above can be utilized in the manufacturing process through suitable substitution.

At an initial step, the upper transverse section 122 of the handle 120 is formed. The upper transverse section 122 includes the aperture 140. In one embodiment, the upper transverse section 122 is formed via a molding process, such as injection molding. In one embodiment of the injection molding process, a first mold half and second mold half are positioned together that collectively form an internal space/volume that corresponds to the size and shape of the upper transverse section 122. A transparent rigid plastic, in molten form, is injected into the space/volume formed by the first mold half and the second mold half to form the upper transverse section 122.

The decorative member 150 is applied to the bottom surface 126 of the upper transverse section 122 to at least partially cover (i.e., overlie) the aperture 140. In this embodiment, the decorative member is preferably a decal, or other type of label, as described above. In one embodiment, the decorative member 140 is applied to the bottom surface 126 of the upper transverse section 122 to cover the entirety of the aperture 140. The decorative member 150 is applied to the upper transverse section 122 subsequent to its injection molding formation and after adequate cooling of the molten transparent rigid plastic in one embodiment. In another embodiment, the decorative member 150 is positioned within the space/volume formed by the first and second mold halves prior to the injection of the molten transparent rigid plastic. In such an embodiment, the application of the decorative member 150 to the upper transverse section 122 occurs concurrently with the formation of the upper transverse section 122.

While an injection molding process is described above to form the upper transverse section 122 with the aperture therein 140, it is possible to form the aperture 140 in the upper transverse section 122 at a subsequent processing step, such as by milling, machining or drilling the previously formed upper transverse section 122. Moreover, it is possible to form the upper transverse section 122 using other manufacturing techniques, such as stamping, machining, milling, and/or combinations thereof. Finally, while not required in all embodiments of the inventive method, during the formation of the upper transverse section 122, the neck 115 and the head 120 of the oral care implement 100 are also concurrently and integrally formed as a unitary structure with the upper transverse section 122 using one of the techniques disclosed above, and preferably injection molding.

Once the upper transverse section 122 is formed and the decorative member 150 is applied thereto as described above, the lower transverse section 121 of the handle 120 is formed and coupled to the upper transverse section 122 so that the decorative member 150 is disposed therebetween and at least a portion 151 of the decorative member 150 is exposed via the aperture 140. In one embodiment, the lower transverse section 121 is formed via a molding process, such as injection molding. In one embodiment, the lower transverse section 121 injection molding process is accomplished by leaving the recently formed upper transverse section 122 (with the applied decorative member 150) in the first mold half, removing the second mold half, and positioning a third mold half into contact with the first mold half. In this embodiment, the third mold half will have a cavity/space formed therein that corresponds in size and shape to the lower transverse section 121 and the third mold half will be aligned with the first mold half so that the cavity/space will be in properly aligned spatial communication with the recently formed upper transverse section 122 (with the applied decorative member 150). Once properly aligned, a transparent TPE, in molten form, is injected into and fills the cavity/space of the third mold half, thereby contacting and covering the rear surface 154 of the decorative member 150 and the exposed portions of the bottom surface 126 of the upper transverse section 122.

While an injection molding process is described above to form the lower transverse section 121, it is possible to form the lower transverse section 121 using other manufacturing techniques, such as stamping, machining, milling, and/or combinations thereof. Furthermore, while the upper transverse section 122 (with the applied decorative member 150) remains in-situ within the first mold half while the second and third mold halves are alternated in the above-desired injection molding process, in certain embodiments, the upper transverse section 122 (with the applied decorative member 150) will be transferred out of the first mold half after adequate cooling and positioned in an appropriate space of two different mating mold halves.

Preferably, when an injection molding process is used, the transparent TPE of the lower transverse section 121 and the transparent rigid plastic of the upper transverse section 122 are selected so that a suitable chemical bond develops therebetween. Of course, materials can be selected that do not chemically bond. In such circumstances, the lower and upper transverse sections 121, 122 will be designed so that a mechanical coupling will be effectuated between the lower and upper transverse sections 121, 122, with the decorative member 150 secured therebetween. Alternatively, an intermediate layer can be disposed between the lower and upper transverse sections 121, 122 to effectuate a suitable chemical bond and/or mechanical fit.

A second method of forming the oral care implement 200 according to another embodiment of the present invention will now be described. While the method will be described below with respect to one particular embodiment of the oral care implement 200 regarding particular materials of construction of the transverse sections 221, 222 and the decorative label 250, it is to be understood that any of the material permutations described above can be utilized in the manufacturing process through suitable substitution.

At an initial step, the lower transverse section 221 of the handle 220 is formed. In one embodiment, the lower transverse section 221 is formed via a molding process, such as injection molding. In one embodiment of the injection molding process, a first mold half and second mold half are positioned together that collectively form an internal space/volume that corresponds to the size and shape of the lower transverse section 221. A transparent rigid plastic, in molten form, is injected into the space/volume formed by the first mold half and the second mold half to form the lower transverse section 221.

The decorative member 250 is applied to the top surface 225 of the lower transverse section 222. The decorative member 250 in this embodiment can be a decal or a layer of ink printed on the top surface 225. The decorative member 250 is applied to the lower transverse section 221 subsequent to its injection molding formation and after adequate cooling of the molten transparent rigid plastic in one embodiment. In another embodiment, the decorative member 250 is positioned within the space/volume formed by the first and second mold halves prior to the injection of the molten transparent rigid plastic. In such an embodiment, the application of the decorative member 250 to the lower transverse section 221 occurs concurrently with the formation of the lower transverse section 221.

While an injection molding process is described above to form the lower transverse section 221, it is possible to form the lower transverse section 221 using other manufacturing techniques, such as stamping, machining, milling, and/or combinations thereof. Finally, while not required in all embodiments of the inventive method, during the formation of the lower transverse section 221, the neck 215 and the head 220 of the oral care implement 200 are also concurrently and integrally formed as a unitary structure with the lower transverse section 222 using one of the techniques disclosed above, and preferably injection molding.

Once the lower transverse section 221 is formed and the decorative member 150 is applied thereto as described above, the upper transverse section 222 of the handle 220 is formed and coupled to the lower transverse section 221 so that the decorative member 250 is disposed therebetween and at least a portion 251 of the decorative member 250 is exposed via an aperture 240 in the upper transverse section 222. In one embodiment, the upper transverse section 222 is formed via a molding process, such as injection molding. In one embodiment, the upper transverse section 222 injection molding process is accomplished by leaving the recently formed lower transverse section 221 (with the applied decorative member 150) in the first mold half, removing the second mold half, and positioning a third mold half into contact with the first mold half. In this embodiment, the third mold half will have a cavity/space formed therein that corresponds in size and shape to the upper transverse section 222 and the third mold half will be aligned with the first mold half so that the cavity/space will be in properly aligned spatial communication with the recently formed lower transverse section 221 (with the applied decorative member 250). Once properly aligned, a transparent TPE, in molten form, is injected into and fills the cavity/space of the third mold half, thereby contacting and covering a portion 252 of the top surface 253 of the decorative member 250 and the exposed portions of the top surface 225 of the lower transverse section 221. The third mold has a plug portion that corresponds in size and shape to the aperture 240 and contacts the upper surface 253 of the decorative member 250. As a result, the aperture 240 is formed in alignment with a portion 251 of the decorative member 250 that will remain exposed via the resulting aperture 240.

While an injection molding process is described above that forms the upper transverse section 222, it is possible to form the upper transverse section 222 using other manufacturing techniques, such as stamping, machining, milling, and/or combinations thereof. Furthermore, while the lower transverse section 221 (with the applied decorative member 150) remains in-situ within the first mold half while the second and third mold halves are alternated in the above-desired injection molding process, in certain embodiments, the lower transverse section 221 (with the applied decorative member 250) will be transferred out of the first mold half after adequate cooling and positioned in an appropriate space of two different mating mold halves.

Preferably, when an injection molding process is utilized, the transparent TPE of the upper transverse section 222 and the transparent rigid plastic of the lower transverse section 221 are selected so that a suitable chemical bond develops therebetween. Of course, materials can be selected that do not chemically bond. In such circumstances, the lower and upper transverse sections 221, 222 will be designed so that a mechanical coupling will be effectuated between the lower and upper transverse sections 221, 222, with the decorative member 250 secured therebetween. Alternatively, an intermediate layer can be disposed between the lower and upper transverse sections 221, 222 to effectuate a suitable chemical bond and/or mechanical fit.

While a number of embodiments of the current invention have been described and illustrated in detail, various alternatives and modifications will become readily apparent to those skilled in the art without departing from the spirit and scope of the invention. As various changes could be made in the above methods, compositions and structures without departing from the scope of the invention, it is intended that all matter contained in this application, including all mechanisms and/or modes of interaction described above, shall be interpreted as illustrative only and not limiting in any way the scope of the appended claims.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

What is claimed is:

1. An oral care implement comprising:
    a handle having a longitudinal axis and a head connected to the handle;
    the handle comprising a first transverse section and a second transverse section, the first transverse section coupled to the second transverse section;
    a decorative member having a first portion that is sandwiched between a bottom surface of the first transverse section and a top surface of the second transverse section; and
    an aperture extending through the first transverse section that exposes a second portion of the decorative member;
    wherein the aperture forms a basin in the first transverse section, a top surface of the decorative member forming a floor of the basin, and the basin comprising a wall extending upward from the floor of the basin and terminating at an outer surface of the first transverse section.

2. The oral care implement of claim 1 wherein the decorative member comprises a visual indicia comprising at least one of a logo, an alphanumeric symbol, a character, an animal, a plant, a pattern, and a symbol.

3. The oral care implement of claim 1 wherein the decorative member is a decal.

4. The oral care implement of claim 1 wherein the decorative member is a layer of ink printed on one of the first or second transverse sections.

5. The oral care implement of claim 1 wherein the first transverse section is formed of a substantially transparent material.

6. The oral care implement of claim 1 wherein the second transverse section is formed of a substantially transparent material.

7. The oral care implement of claim 1 wherein the second transverse section is formed of an opaque material.

8. The oral care implement of claim 1 wherein one of the first and second transverse sections is formed of a rigid material and the other one of the first and second transverse sections is formed of an elastomeric material.

9. The oral care implement of claim 1 wherein the first and second transverse sections are formed of a rigid material.

10. The oral care implement of claim 1 further comprising a neck positioned between the handle and the head, wherein the head, the neck and the first transverse section are a unitary structure.

11. The oral care implement of claim 1 further comprising a neck positioned between the handle and the head, wherein the head, the neck and the second transverse section are a unitary structure.

12. The oral care implement of claim 1 wherein the wall extends upward from the floor in an inclined manner.

13. The oral care implement of claim 1 wherein the wall extends upward from the floor in a substantially normal manner.

14. The oral care implement of claim 1 wherein an entirety of the second portion of the decorative member is recessed below the outer surface of the first transverse section that is opposite the bottom surface of the first transverse section.

15. The oral care implement of claim 1 wherein the first portion of the decorative member is in direct surface contact with the bottom surface of the first transverse section and the top surface of the second transverse section.

16. The oral care implement of claim 1 wherein the first transverse section overlies the first portion of the decorative member.

17. The oral care implement of claim 16 wherein the first portion of the decorative member is a perimeter portion that surrounds the second portion, the perimeter portion of the decorative member in direct surface contact with the bottom surface of the first transverse section and the top surface of the second transverse section.

18. The oral care implement of claim 1 further comprising tooth cleaning elements extending outwardly from a first face of the head.

19. A method of forming an oral care implement comprising:
a) forming a first transverse section of a handle of the oral care implement;
b) applying a decorative member to the first transverse section;
c) forming a second transverse section of the handle on the first transverse section after the first transverse section is formed and the decorative member is applied to the first transverse section, the decorative member disposed between the first and second transverse sections, and the second transverse section comprising an aperture through which at least a portion of the decorative member is exposed, wherein the aperture forms a basin in the second transverse section, a top surface of the decorative member forming a floor of the basin, and the basin comprising a wall extending upward from the floor of the basin and terminating at an outer surface of the second transverse section.

20. The method of claim 19 wherein step a) comprises injection molding the first transverse section, and step c) comprises injection molding the second transverse section.

21. The method of claim 19 wherein the oral care implement further comprises a neck and a head, and step a) comprises injection molding the first transverse section, the neck and the head as a unitary structure.

22. The method of claim 19 wherein the oral care implement further comprises a neck and a head, and step c) comprises injection molding the second transverse section, the neck and the head as a unitary structure.

23. The method of claim 19 wherein the portion of the decorative member that is exposed through the aperture is recessed below an outer surface of the second transverse section.

24. An oral care implement comprising:
a handle having a longitudinal axis and a head connected to the handle;
the handle comprising a first transverse section and a second transverse section, the first transverse section coupled to a top surface of the second transverse section;
a decorative member selected from the group consisting of a single layer laminate, a double layer laminate, and printed indicia positioned on the top surface of the second transverse section; and
an aperture extending through the first transverse section that exposes at least a portion of the decorative member, wherein the aperture forms a basin in the first transverse section, a top surface of the decorative member forming a floor of the basin, and the basin comprising a wall extending upward from the floor of the basin and terminating at an outer surface of the first transverse section.

25. The oral care implement of claim 24 wherein the first transverse section comprises a top surface and a bottom surface and the second transverse section comprises the top surface and a bottom surface, the bottom surface of the first transverse section coupled to the top surface of the second transverse section, the top surface of the first transverse section and the bottom surface of the second transverse section collectively forming an outer surface of the handle.

26. The oral care implement of claim 25 wherein the exposed portion of the decorative member is recessed below the outer surface of the handle.

27. The oral care implement of claim 24 wherein the aperture is elongated along the longitudinal axis of the handle.

* * * * *